United States Patent
Fladung

[11] Patent Number: 6,109,957
[45] Date of Patent: Aug. 29, 2000

[54] DEVICE FOR TAKING-UP OR STOWING A CABLE

[76] Inventor: Manfred Fladung, Heimbach 26, 63776 Mömbris, Germany

[21] Appl. No.: 09/367,865
[22] PCT Filed: Mar. 6, 1998
[86] PCT No.: PCT/EP98/01309
    § 371 Date: Sep. 3, 1999
    § 102(e) Date: Sep. 3, 1999
[87] PCT Pub. No.: WO98/39829
    PCT Pub. Date: Sep. 11, 1998

[30] Foreign Application Priority Data

Mar. 6, 1997 [DE] Germany ............ 297 04 035 U

[51] Int. Cl.⁷ .................................................. H01R 13/72
[52] U.S. Cl. ................ 439/501; 191/12.4; 242/54 R
[58] Field of Search ........................ 439/501, 22, 27, 439/18, 19, 20, 21, 29, 4; 174/69; 191/12 R, 12.4, 12.2 A; 242/54 R

[56] References Cited

FOREIGN PATENT DOCUMENTS

| | | |
|---|---|---|
| 163025 | 3/1985 | European Pat. Off. |
| 0163025 | 12/1985 | European Pat. Off. |
| 0537212 | 4/1993 | European Pat. Off. |
| 3113444 | 10/1982 | Germany |
| 3133842 | 3/1983 | Germany |
| 3443932 | 6/1986 | Germany |
| 628860 | 3/1982 | Switzerland |
| 2095209 | 9/1982 | United Kingdom |
| 86/07209 | 12/1986 | WIPO |

*Primary Examiner*—Gary F. Paumen
*Assistant Examiner*—PhuongChi Nguyen
*Attorney, Agent, or Firm*—Dennison, Scheiner, Schultz & Wakeman

[57] ABSTRACT

A device for taking-up or stowing a cable (16, 64) with several leads (36), including a take-up drum (18, 60) which rotates around an axle (30, 38) to take up the cable is disclosed. The leads of the cable are connected to a first connection device (38). This first connection device also provides an electrically conductive connection to the lines of a supply. In order to prevent the leads of the cable from breaking when the drum rotates, the first connection device should be connected to the drum and should have first electrical contacts (50, 56) located on circuits which run coaxially to the drum axle and are connected to the leads (36) of the cable. The electrical lines leading to the supply should be connected to a second connection device (48) which can be shifted axially along the drum axle and should have second electrical contacts (56, 50) which form an electrically conductive connection with the first electrical contacts (56, 50).

14 Claims, 6 Drawing Sheets

DEVICE FOR TAKING-UP OR STOWING A CABLE

The invention related to a device for taking up or stowing of a cable comprising several leads, having a take-up drum rotatable about an axis for taking up of the cable, the leads of which are connected to a first connection device, via which an electrically conductive connection is provided to lines of a supply system and which is connected to the take-up drum, and having first electrical contacts which are arranged on circles running coaxially to the drum axis, connected to the leads of the cable, and in that the electrical lines leading to the supply system are connected to a second connection device that has second electrical contacts making an electrically conductive connection with the first electrically conductive contacts when the take-up drum comes to a standstill.

A device of the type mentioned above is known from DE-A-3113444. This known device comprises two pairs of sliding contacts. Each pair of sliding contacts comprises two contact discs, one being flat and the other with an elevation which is spring-pressed against the first contact disc. The pair of sliding contacts are placed on the flange pairs, respectively. One of the two flanges is attached in a stationary position to a hub of a fixed casing, whilst the other flange is attached to the hub of a rotatable take-up drum. Both flanges of each flange pair are at a constant distance from each other.

A take-up drum for an electrical cable is also known which can be pulled out by hand and rolled up on the drum by means of an electric motor-driven power supply. The take-up drum has a ring-shaped wall placed inside the drum on the motor casing. The wall has three sliding rings which are embedded in the wall, concentrically to the swivel axis of the motor. A contact block has three sliding contacts which are pressed in a sliding manner against one of the sliding rings, respectively (WO-A-8607209).

Other devices for housing or storing a cable comprising several leads can be found in EP-B-0532 212 or EP-B-0163025 for example. In the first named stowing device, the cable is wound in one layer onto a hollow-cylinder carrier element, which in turn is rotatable about an axis, e.g. a gear motor, coinciding with the central axis of the element. Inside the take-up drum is an equalizing cable allowing a link-up to a permanent connection of the supply system. The equalizing cable is here more or less twisted. The strain normally imposed on the supply cable is reduced by splitting it inside the rotary element into two sections of preferably equal length, thereby splitting the twisting effect. In the stowing device according to EP-B-0 163 026 B1, the take-up roller comprises two drum disks between which is the connection cable in the wound-on state. The distance between the two drum disks is matched to the diameter of the connection cable such that the wound-on layers are on one plane next to one another. The take-up drum itself, which can be preferably disposed underneath an airport gangway, has a vertically aligned rotary axis. The link-up between the connection cable and a permanent connection in the form of an equalizing cable runs in a spiral form inside a dome-like housing section, with the leads being exposed to prevent their breaking. The leads form a kind of "whisk" which— depending on the wound or unwound state of the connection cable—is spirally rotated to a greater or lesser degree and at the same time twisted.

The problem underlying the present invention is to develop a device of the type mentioned so that no electrically conductive connection is given between the electric contacts of the first connection device and the electric contacts of the second connection device during take-up drum rotation whilst the cable is being pulled out or rolled up.

The problem is solved in accordance with the invention using the above device in that the second electrical connection device runs at a distance to the first electrical connection device when the take-up drum is rotating and moved axially along the drum axis, and the first and second electrical contacts are separated, and that the second electrical connection device can be moved in the direction of the first electrical connection device after the take-up drum has come to a standstill.

The fact that the first electrical connection device is rotated together with the drum means that the supply cable having several leads and all its leads, respectively, can be passed untwisted between the inner end of the cable that can be wound onto/unwound from the take-up drum and the connection device. The risk of cables breaking is therefore ruled out. As soon as the drum is no longer being rotated, the second electrical connection device is axially moved along the drum axis in order to bring its electrical contacts into electrically conductive connection with those of the first connection device. Then a signal or current can be transmitted via the leads. The fact that a current does not flow until the first and second electrical contacts have a conductive connection ensures that destruction of the contacts by spark formation is ruled out. Since there is no relative movement between the first and the second electrical contacts during the current/signal transmission, the contacts can be subjected to the necessary pressure to rule out unwelcome contact resistances.

In other words, it is provided that when the drum is rotating the second electrical connection device runs at a distance to the first electrical connection device. If by contrast the drum is stationary, the second electrical connection device is moved on a shaft by—for example—an electric motor, a spindle drive or a lifting solenoid along the drum axis in the direction of the first electrical connection device connected to the drum, with a current or signal being transmitted when the first and second electrical contacts have an electrically conductive connection. To that end, sensors such as switches can be provided, using which it is checked whether the first and second electrical contacts have a conductive connection or not.

If a spindle drive is used for axial adjustment of the second electrical connection device, the spindle action can be selected such that the second electrical connection device is kept in contact with the first electrical connection device by self-locking.

Preferably, an electric motor rotates a hollow cylinder surrounding the shaft of the drum and having an external thread, in which hollow cylinder extends a sleeve extending from a disk-like carrier of the second electrical connection device. If the hollow cylinder not axially movable on the shaft is rotated, the sleeve and hence the second electrical connection device is moved along the shaft. A purely translatory movement is assured by an anti-rotation element extending stationarily from the shaft, preferably from a disk-like holder of the motor.

If the drum has a hollow cylinder-type carrier element for the windable/unwindable cable, it is provided that the second electrical connection device is arranged movably inside the carrier element. The first and the second electrical connection devices are adapted to be arranged within the carrier element.

It is also possible for the first electrical connection device to project from a plane formed vertically to the cable and extend rotatably along the rotary axis inside a stationary holder such as a dome-like section, inside which the second electrical connection device is arranged axially movable.

In order to ensure the necessary contact, irrespective of the radial position between the first and the second connection device, the first or second electrical contacts are contact pins and the second or first contacts contact rings. Here the contact pins are preferably spring-biased pins, in particular brass pins.

The contact pins extend preferably from the first connection device, which is rotatable together with the drum.

The first and/or second connection device has a housing made of insulating material and preferably in cylindrical form, the front surface of said housing having the first or second electrical contacts. If the electrically conductive contacts are designed as contact rings, they run set back from the surface of the end face and are kept apart by webs which are chamfered on their outer edges to assist insertion of the contact pins.

In order to check the position of the contacts to one another, in particular to check whether they have an electrically conductive connection, at least one sensor such as a switch is assigned to a first and/or second electrical contact. Here the switch can be a contact switch extending from one of the front faces of the housing of the connection devices and actuatable through the other front face or by an element extending therefrom such as an electrically conductive contact.

It is also possible to control the axial adjustment of the second connection device using at least one limit switch.

While the device in accordance with the invention is intended in particular for aircraft supply systems, it is also suitable for use in other current connections.

Further details, advantages and features of the invention are shown not only in the claims and in the features they contain—singly and/or in combination—but also in the following description of preferred embodiments shown in the drawing.

The figures are intended to explain the invention on the basis of a connection cable of a central aircraft supply system, without thereby restricting he invention. Instead the teachings in accordance with the invention can be applied wherever in particular thick cables are to be wound and unwound and connected with their stowing-side end to a supply system by a permanent connection without the need or connection cables that are twisted, and a current transmission is achieved that in principle would be possible using slip-rings.

Figure 1:
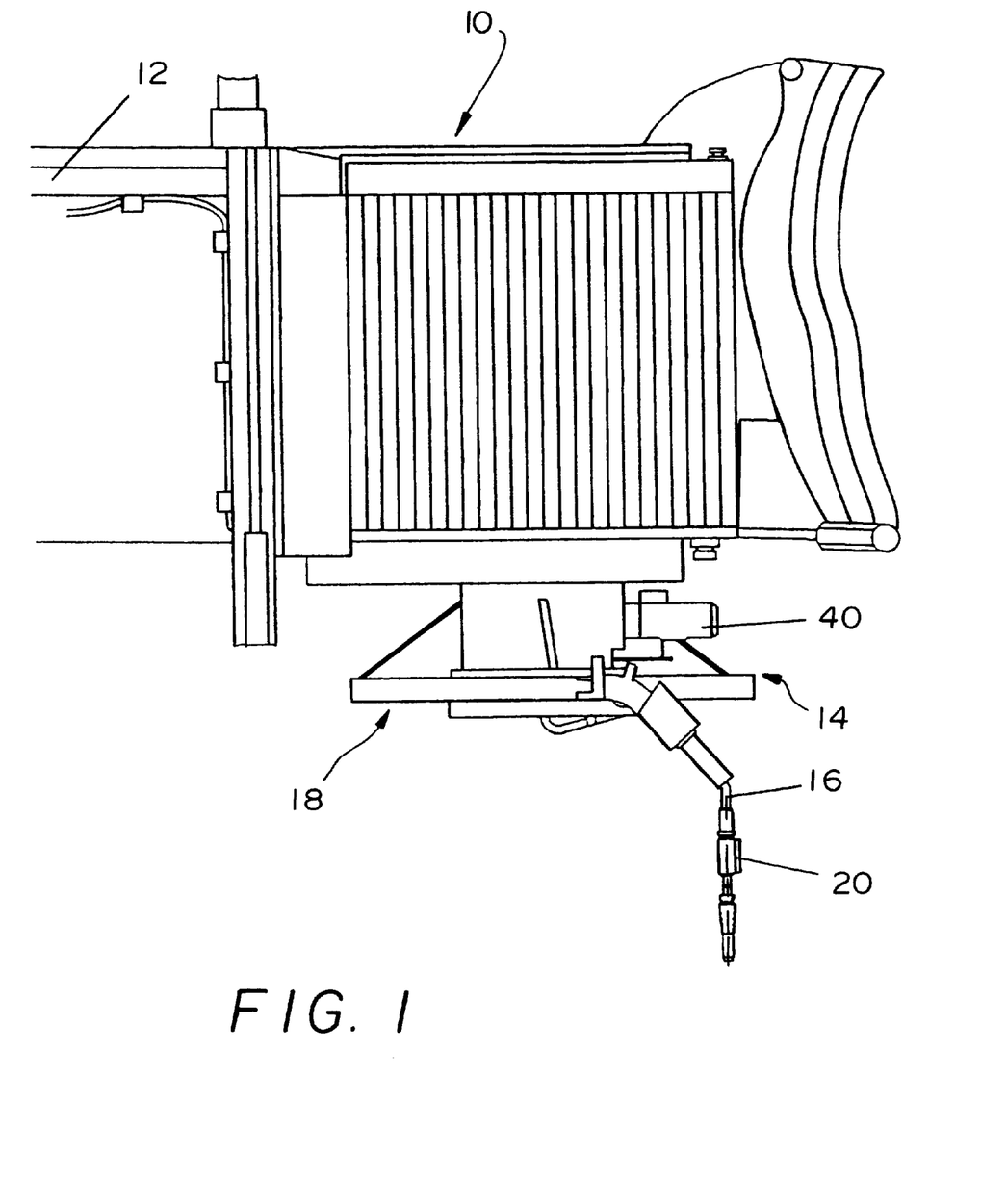
FIG. 1 shows a side view of a top end of a telescoping airport gangway with a device for stowing of a connection cable of a central aircraft supply system.

FIG. 1 shows the top end 10 of a telescoping airport gangway 12. On the underside of the top end 10 a device 14 is attached for stowing of a connection cable 16 of a central aircraft supply system for aircraft. The connection cable 16 comprises a section that can be wound onto/unwound from a take-up drum 18. At its free end the connection cable has a plug 20 preferably designed as a panel and which can plugged into an appropriate receptacle on the aircraft.

Figure 2:
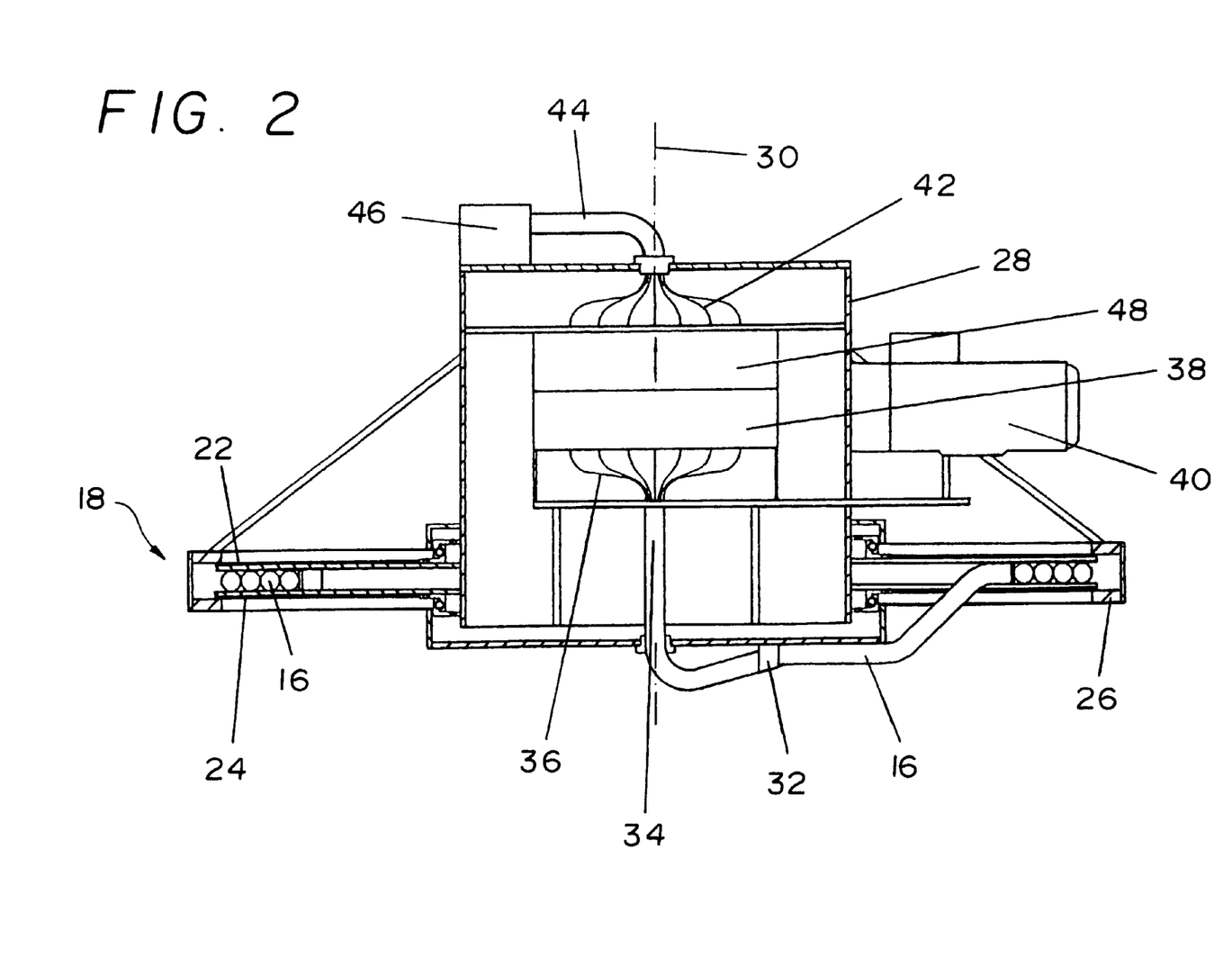
FIG. 2 shows a longitudinal section through the device shown in FIG. 1 in the area of the stowing device.

In the embodiment according to FIGS. 1 and 2, the take-up drum 18 comprises two parallel drum disks 22, 24, between which is the connection cable 16 in the wound-on state in one layer. The distance between the drum disks 22, 24 is matched to the diameter of the connection cable 16.

The drum disks 22, 24 are mounted in a housing 26 with a dome-like section 28. The dome like section 28 extends vertically from the planes shaped by the drum disks 22, 24 along the rotary axis 30 of the drum disks 22, 24.

The connection cable 16 passes—if necessary via a holder 32—into a section 34 along the rotary axis 30 and inside the dome-like housing section 28. Along the section 34 its leads 36 are exposed in order to be connected to first electrical contacts in a first electrical connection device 38 which rotates with the drum 18, which is actuatable via a motor such as a gear motor 40 arranged on the outside of the housing 28. Naturally manual actuation is also possible with smaller drums.

The connection cable 16 is connected to the lines or leads 42 of a connecting cable 44 that leads via a connection cable 16 to a central supply system. As a result, current can flow or signals can be transmitted via the leads 42, 36. The leads 42, 36 can therefore be lines that are assigned to individual phases of a 400 Hz 3-phase AC or a control line. As an example, 7 leads can be provided for power current and at least 6 leads for control lines.

The leads or lines 42 extending from the connecting cable 44 in their turn end in a second electrical connection device 48 axially adjustable along the rotary axis 30, in order to be moved—when the cable drum 18 is stationary—in the direction of the first connection device 38 receiving the leads 36 of the connection cable 16. As a result, the necessary electrical connection is made. To do so, second electrical contacts are provided in the second electrical connection device 48 and are connected to the leads 42.

In other words, the electrically conductive connection is made between the cable 44 leading to a supply system and the windable/unwindable cable 16 via a first connection device 38 rotatable with the drum 18 and via second electrical connection device 48 which is movable axially inside the dome-like section 28 of the housing, inside which the drum 18 is rotatable. This movement along the rotary axis 30 should however only take place when the cable drum 18 is stationary. In this case, the second electrical connection device 48 can be adjusted in the direction of the first connection device 38. This is possible by, for example, a spindle drive, by lifting solenoids, by electric motor with meshing gears and threads, or other suitable means.

Figure 4:
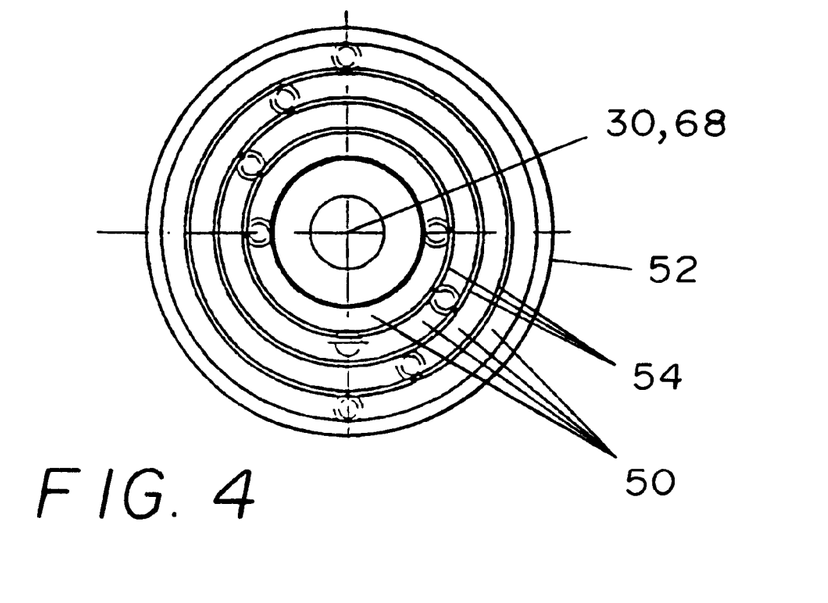
FIG. 4 shows a front view of a electrical connection device connected to the stowing device.
Figure 5:
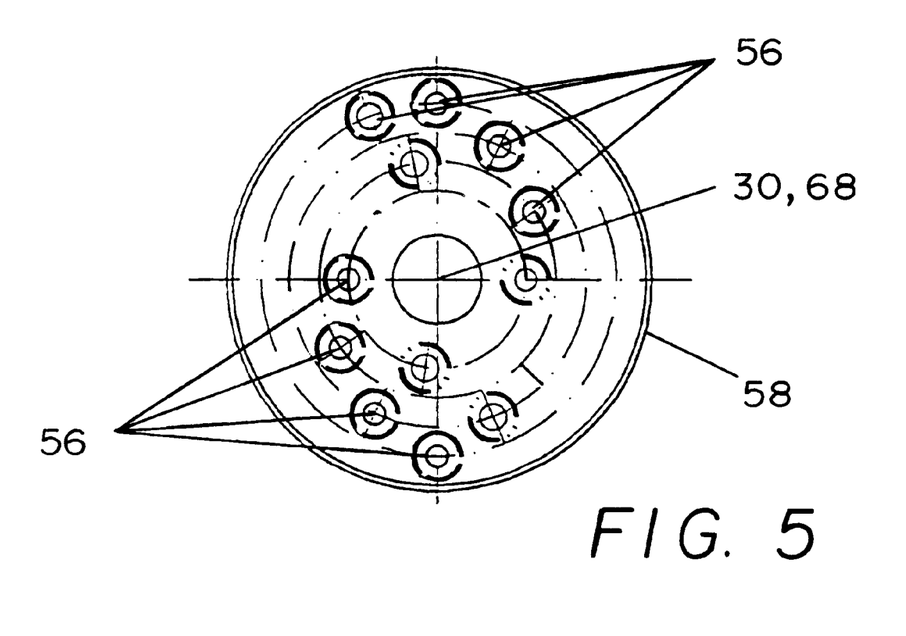
FIG. 5 shows a front view of a connection device from which electrical lines lead to a supply system.

The connection devices 38, 48 each preferably comprise a cylindrical housing made of plastic, whose facing end surfaces 52, 58 have the necessary electrical contacts connected to the leads 36 and 42 respectively.

The leads 36 of the connection cable 16 can therefore end in contact rings 50 running coaxially to the rotary axis 30 of the drum 18. The contact rings 50 are here arranged set back from the surface of the insulating material housing of the connection device 38. The webs 54 between the contact rings 50 are chamfered at their edges.

The cylindrical housing likewise made of plastic and having the second connection device 18 has spring-biased contact pins 56 that are connected to the leads of the connecting cable 44. The contact pins 56 are located on circles coaxial to the rotary axis 30 of the drum 18 and matching those of the contact rings 50. In this way, it is assured that whenever the second connection device 48 approaches the first connection device 38 the necessary electrical contact between the contact pins 56 and the contact rings 50 is made.

In addition, a contact pin can extend from the end surface 58—passed through by the contact pins 56—of the housing of the axially movable connection device 48, using which contact pin it can be ascertained whether the necessary contact between the contact pins 56 and the contact rings 50 exists. The current is not passed via the connecting cable 44 to the connection cable 16 until an appropriate signal has been given.

Since there is no voltage applied during approach/withdrawal of the axially movable connection device 48 to/from the rotating connection device 38, it is assured that spark formation which might lead to destruction is ruled out.

Figure 3:
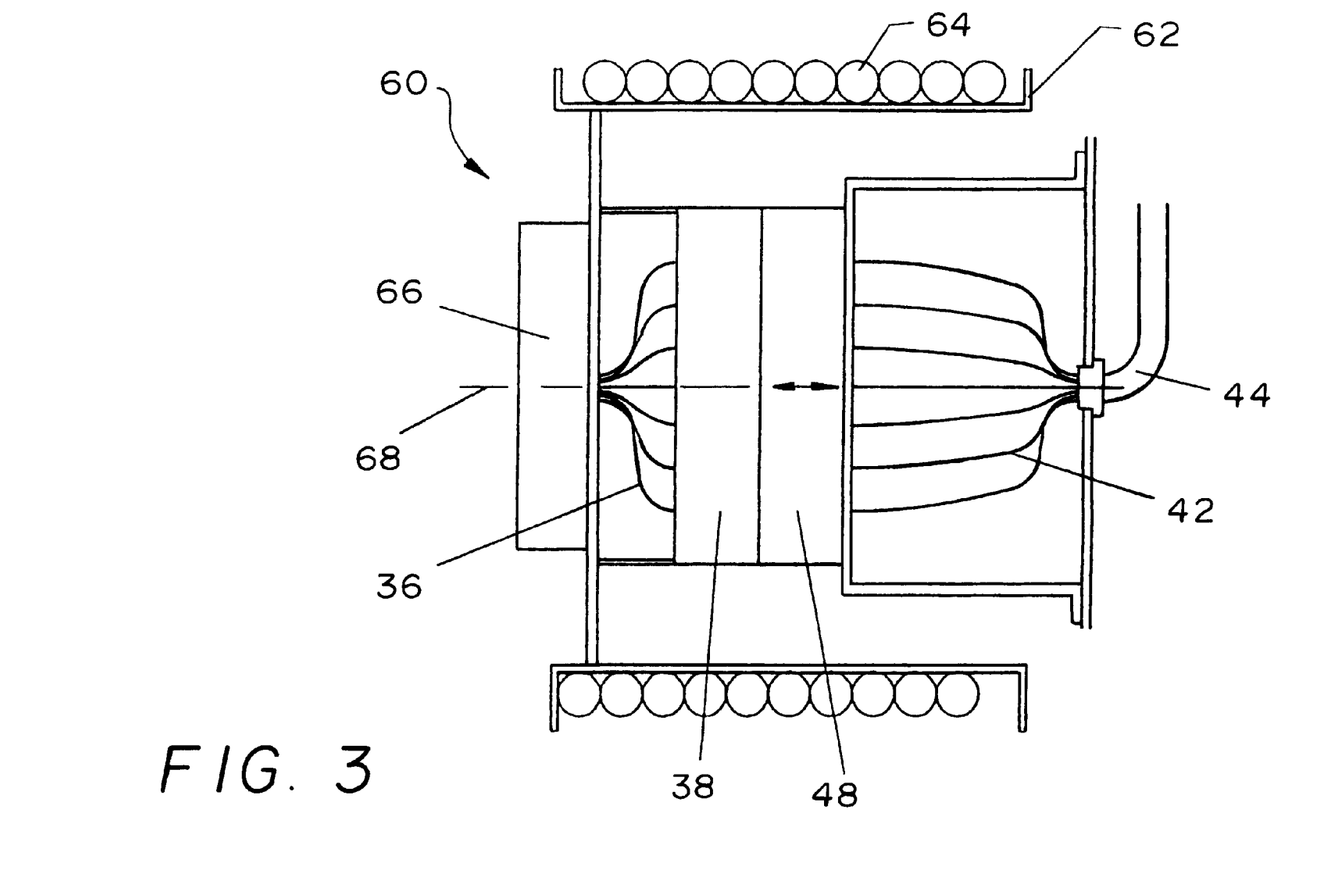
FIG. 3 shows a sectional view of a further embodiment of a stowing device.

An alternative embodiment of a stowing device 60 is shown in FIG. 3, which however corresponds in respect of its connection devices 38 and 48 with those of FIGS. 1 and 2, so that to that extent the same reference numbers are used for identical elements.

The stowing device 60 comprises a hollow-cylinder carrier element 62 on which a connection cable 64 can be wound/unwound in one layer. This connection cable 64 passes with one end into a connection box 66 or via leads 36 to the first connection device 38, more precisely to its contact rings 50. The connection device 38 moves together with the cable drum.

The second connection device 48 is axially movable along the rotary axis of the stowing device 60 and is connected to the lines or cables 42 of the connecting cable 44. Both the first and the second connection devices 38, 48 are arranged in the interior of the carrier element 62. The result is a low-maintenance installation.

The carrier element 62 itself is rotated in the usual way clockwise or counter-clockwise, depending on whether the supply cable 64 is being wound or unwound.

As in the embodiment in FIGS. 1 and 2, the first and second connection devices 38, 48 should be at a distance as long as the take-up drum 60 is being rotated. Only at standstill, i.e. when the supply cable 64 has been unwound to the necessary extent, for example for insertion into a receptacle of an aircraft, can the second connection device 48, which is only axially adjustable, be moved in the direction of the first connection device 38, in order to provide the necessary contact between the contact rings 50 and the contact pins 56 for permitting the flow of current and signals via the leads 42 of the connecting cable to the leads 36 of the connection cable 64.

Without departing from the invention, the end face 52 of the rotatable connection device 38 can have contact pins and the connection device 48, which is adjustable only along the rotary axis, can have contact rings. The axial adjustment of the second connection device 18 can be controlled using a switch. Regardless of this, it is generally provided that the first and second connection devices 38, 48 are not rotated against one another when the contacts have an electrically conductive connection. Also, a current cannot flow until the necessary electrical connection has been made between the contacts 50, 56.

Figure 6:
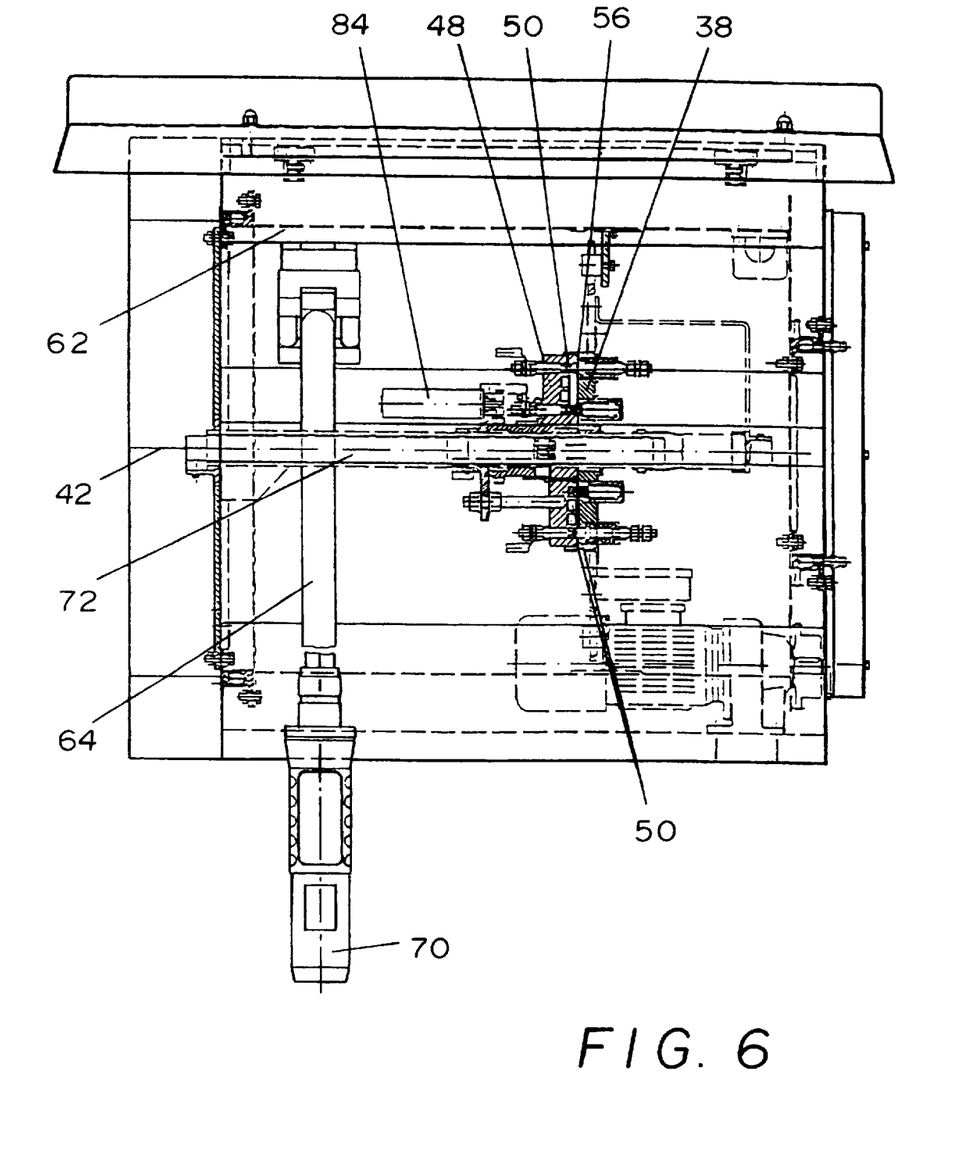
FIG. 6 shows a sectional view through a stowing device designed as a drum.
Figure 7:
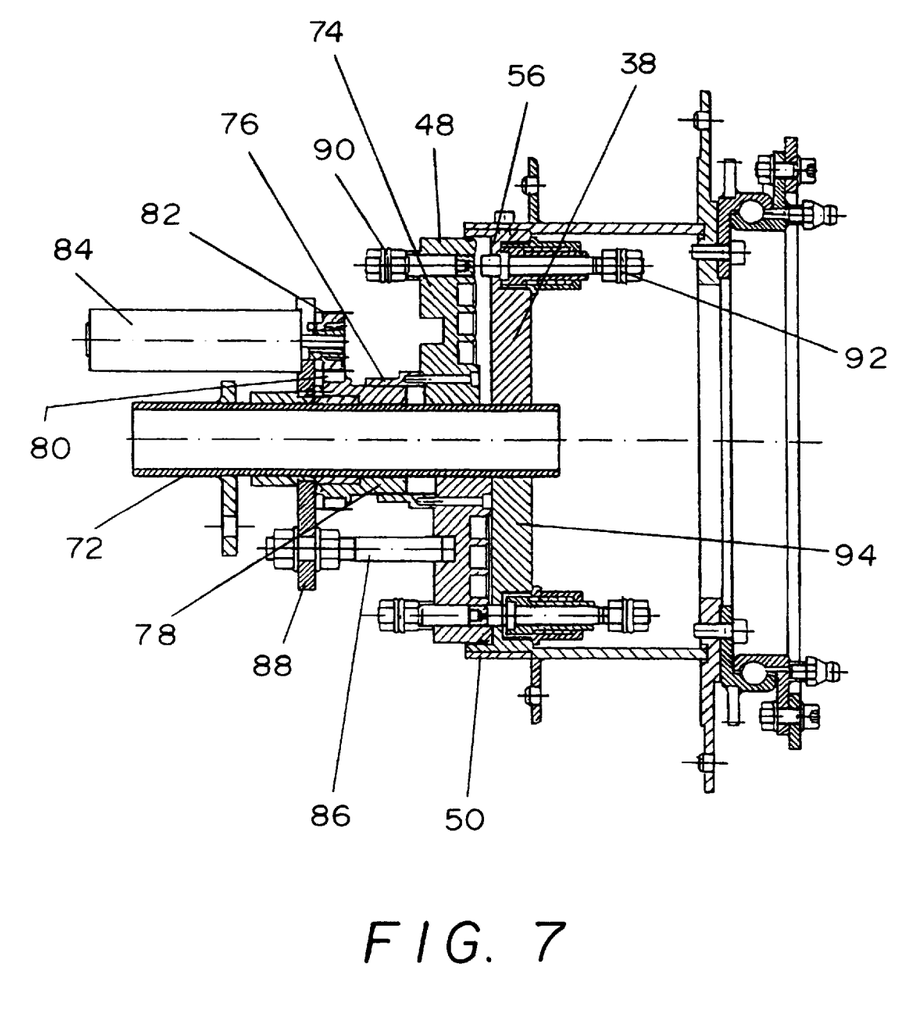
FIG. 7 shows a detailed view of FIG. 6.

The embodiment of FIGS. 6 and 7 generally correspond to those in FIG. 3 to 5, so that to that extend the same reference numbers can be used for identical elements. Therefore a cable 61 can be wound onto/unwound from a drum element 62 rotatable about an axis 42 and has at its free end a plug such as a panel 70 which can for example be inserted into a plug receptacle of an aircraft in order to provide the latter with current or the necessary signals. Along the axis 42 extends a shaft 72, along which the first and second connection devices 38, 48 can be moved and rotated respectively. The first connection device 38 is stationarily connected to an axis 42 and has in the embodiment spring-biased contact pins 56 that can be brought into contact with contact rings 50 arranged coaxially thereto when the second connection device 48 is moved along the shaft 72 in the direction of the first connection device 38.

As FIG. 7 makes clear, a sleeve 76 extending from the second connection device 48, which has a disk-like carrier element 74, runs coaxially to the shaft 72 and surrounds a hollow cylinder 78 which in its turn is arranged axially unmovable, but rotatable on the shaft 72. The clinder 78 has an external thread and the sleeve 76 an internal thread, these threads engaging with one another. The hollow cylinder 78 is designed on the peripheral side as a toothed disk or has an appropriate toothed ring 80 which in turn meshes with a gear 82 that is rotatable by an electric motor 84. If the electric motor 84 is operated, the hollow cylinder 80 performs a rotation, with the result that the sleeve 76 and hence the disk-like carrier element 74 of the second connection device 48 is moved along the shaft 72. Here an exclusively translatory movement takes place, since the disk-like carrier element 74 is secured against rotation. This can be achieved by, for example, a pin or rod 86 that extends from the carrier 74 and passes through a disk element 88 which in its turn is connected stationarily to the shaft 72 and can double as a holder for the electric motor 84.

The contact pins 56 are, as mentioned, spring-biased in order to assure a sufficient electrically conductive contact to the contact rings 50 of the second connection device 48 that are set back from the surface of the disk-like carrier element 74, said contact rings being connectable in their turn via connections 90 to cables or lines; not shown, of a stationary supply system. Accordingly, the contact pins 56 are connectable via connections 92 to the leads of the cable 64. It is of course possible without difficulty to exchange the contact pins and contact rings.

The materials for the contact pins or contact rings can be known alloys used for electrically conductive connections and having at least one hydrogen component to permit sliding of the contact pins on the sliding rings or to prevent unwelcome abrasion when the contact pins slide on the contact rings; because during contact of the contact pins and sliding rings further turning of the drum and hence of the first connection device 38 is possible without difficulty.

The first connection device 38 also has a disk-like carrier element 94, as is the case in respect of the second connection device 48.

What is claimed is:

1. A device (14) for taking up or stowing of a cable (16, 64) comprising several leads (36), having a take-up drum (18, 60) rotatable about an axis (30, 38) for taking up of the cable, the leads of which are connected to a first connection device (38), via which an electrically conductive connection is provided to lines of a supply system and which is connected to the take-up drum (18, 60), and having first electrical contacts (50, 56) which are arranged on circles running coaxially to the drum axis, connected to the leads (36) of the cable (16, 64), and in that the electrical lines (42) leading to the supply system (42) are connected to a second connection device (48) that has second electrical contacts (56, 50) making an electrically conductive connection with the first electrically conductive contacts (50, 56) when the take-up drum (18, 60) comes to a standstill, characterised in that the second electrical connection device (48) runs at a distance to the first electrical connection device (38) when the take-up drum is rotating and moved axially along the drum axis (30, 36), and the first and second electrical contacts are separated, and that the second connection device (38) can be moved in the direction of the first electrical connection device after the take-up drum (18, 60) has come to a standstill.

2. Device according to claim 1, wherein when the drum (18, 60) has stopped, the second electrical connection device (48) is moved in the direction of the first electrical connection device (38) connected to the drum.

3. Device according to claim 1, wherein when the first and second contacts (50, 58) have an electrically conductive connection the second electrical connection device (48) is held by self-locking by means of a spindle.

4. Device according to claim 1, wherein the drum (60) has a hollow cylinder carrier element (62) for the cable to be wound/unwound, inside which carrier element the second electrical connection device (48) is movably arranged.

5. Device according to claim 1, wherein the first electrical connection device (38) projects from a plane formed vertically by the cable and extends rotatably along the rotary axis (30) of the drum (18) inside a stationary holder inside which the second electrical connection device (48) is arranged axially movable.

6. Device according to claim 1, wherein the first or second electrical contacts are contact pins (56) and the second or first electrical contacts are contact rings (50).

7. Device according to claim 6, wherein the contact pins (56) are spring-based pins.

8. Device according to claim 1, wherein during contact or separation of the first and second contacts (50, 56) the second electrical connection device (48) is voltage-free.

9. Device according to claim 1, wherein the first and/or second electrical connection device (38, 48) comprises a cylindrical housing made of insulating material and the end face (52, 58) of said housing has or is passed through by the first or second electrical contacts (50, 56).

10. Device according to claim 1, wherein the contact rings (50) are set back from the surface of the end face (52) and are kept apart by webs (54) which in turn are chamfered on their outer edges.

11. Device according to claim 1, wherein a sensor such as a switch is assigned to at least one first and/or second electrical contact (50, 56) in order tocheck the contact between the first and second electrical contacts.

12. Device according to claim 1, wherein the sensor is a contact switch extending from one of the front faces and actuatable by a mating element of the other front face.

13. Device according to claim 1, wherein the axial adjustment of the second connection device (48) is controllable using at least one limit switch.

14. Device according to claim 1, wherein the axial adjustment of the second connection device (48) is achieved by means of an electric motor (84) and engaging internal and external threads provided on the one hand on a sleeve (76) extending from a disk-like carrier element (74) of the second electrical connection device (48) and on the other hand on a hollow cylinder element (78) rotatable by an electric motor and arranged axially unmovable on a shaft (72) running along the axis.

* * * * *